(12) United States Patent
Tuttle

(10) Patent No.: US 7,859,408 B2
(45) Date of Patent: *Dec. 28, 2010

(54) METHODS AND SYSTEMS OF DETERMINING PHYSICAL CHARACTERISTICS ASSOCIATED WITH OBJECTS TAGGED WITH RFID TAGS

(75) Inventor: John R Tuttle, Boulder, CO (US)

(73) Assignee: Round Rock Research, LLC, Mount Kisco, NY (US)

( * ) Notice: Subject to any disclaimer, the term of this patent is extended or adjusted under 35 U.S.C. 154(b) by 237 days.

This patent is subject to a terminal disclaimer.

(21) Appl. No.: 11/692,538

(22) Filed: Mar. 28, 2007

(65) Prior Publication Data

US 2008/0238685 A1 Oct. 2, 2008

(51) Int. Cl.
*G08B 13/14* (2006.01)
(52) U.S. Cl. ............... 340/572.1; 340/10.1; 340/572.7
(58) Field of Classification Search .......... 340/572.7, 340/572.1, 10.1
See application file for complete search history.

(56) References Cited

U.S. PATENT DOCUMENTS

| | | | |
|---|---|---|---|
| 4,016,568 A | 4/1977 | Makimoto et al. | |
| 4,075,632 A | 2/1978 | Baldwin et al. | |
| 5,900,834 A | 5/1999 | Kubinec | |
| 6,600,418 B2 | 7/2003 | Francis et al. | |
| 6,674,403 B2 | 1/2004 | Gray et al. | |
| 6,717,516 B2 | 4/2004 | Bridgeglall | |
| 6,920,330 B2 | 7/2005 | Caronni et al. | |
| 7,045,996 B2 | 5/2006 | Lyon et al. | |
| 7,049,965 B2 | 5/2006 | Kelliher | |
| 7,091,863 B2 | 8/2006 | Ravet | |
| 7,119,687 B2 | 10/2006 | Paulsen et al. | |
| 7,142,120 B2 | 11/2006 | Charych et al. | |
| 7,156,312 B2 | 1/2007 | Becker et al. | |

(Continued)

FOREIGN PATENT DOCUMENTS

KR   20060112976   11/2006

(Continued)

OTHER PUBLICATIONS

PCT/US08/55537—International Search Report (mailed Jul. 30, 2008).

(Continued)

*Primary Examiner*—George A Bugg
*Assistant Examiner*—Kerri McNally
(74) *Attorney, Agent, or Firm*—Lerner, David, Littenberg, Krumholz & Mentlik, LLP

(57) ABSTRACT

Methods and systems of determining physical characteristics associated with objects tagged with Radio Frequency Identification (RFID) tags. At least some of the illustrative embodiments are methods comprising making a first reading of a RFID tag coupled to an object (an electromagnetic signal received from the RFID tag having a first received signal strength indication (RSSI)), making a second reading of the RFID tag (an electromagnetic signal received from the RFID tag having a second RSSI), and a determining whether the object is moving using (at least in part) the first and second RSSI. Other illustrative embodiments, may determine (in addition to or in place of determining movement) orientation of the object based, at least in part, on the electromagnetic signals.

32 Claims, 6 Drawing Sheets

U.S. PATENT DOCUMENTS

| | | | |
|---|---|---|---|
| 7,215,976 | B2 | 5/2007 | Bridgeglall |
| 7,310,045 | B2* | 12/2007 | Inui .................. 340/572.1 |
| 7,378,967 | B2 | 5/2008 | Sullivan et al. |
| 7,403,120 | B2 | 7/2008 | Duron et al. |
| 7,453,363 | B2 | 11/2008 | Reynolds |
| 2004/0217865 | A1* | 11/2004 | Turner .................. 340/572.7 |
| 2005/0040994 | A1 | 2/2005 | Mazoki et al. |
| 2005/0237953 | A1 | 10/2005 | Carrender |
| 2005/0258937 | A1* | 11/2005 | Neuwirth .................. 340/5.92 |
| 2005/0280539 | A1 | 12/2005 | Pettus |
| 2006/0043199 | A1 | 3/2006 | Baba et al. |
| 2006/0049946 | A1 | 3/2006 | Sullivan et al. |
| 2006/0071790 | A1 | 4/2006 | Duron et al. |
| 2006/0273905 | A1* | 12/2006 | Choi et al. .............. 340/572.1 |
| 2007/0037582 | A1 | 2/2007 | Mohi et al. |
| 2007/0149216 | A1 | 6/2007 | Misikangas |
| 2007/0152831 | A1 | 7/2007 | Eisele |
| 2007/0182578 | A1 | 8/2007 | Smith |
| 2007/0268140 | A1* | 11/2007 | Tang et al. .............. 340/572.4 |
| 2008/0238686 | A1 | 10/2008 | Tuttle |
| 2008/0280560 | A1 | 11/2008 | Tuttle |
| 2009/0091428 | A1 | 4/2009 | Tuttle |
| 2009/0091454 | A1 | 4/2009 | Tuttle |
| 2009/0303004 | A1 | 12/2009 | Tuttle |
| 2009/0303005 | A1 | 12/2009 | Tuttle |

FOREIGN PATENT DOCUMENTS

| | | |
|---|---|---|
| KR | 20070021913 | 2/2007 |
| WO | 2007047226 | 4/2007 |

OTHER PUBLICATIONS

PCT/US08/55537—Writen Opinion (mailed Jul. 30, 2008).

Georgia State University, "Police Radar," located at http://hyperphysics.phy-astr.gsu.edu/hbase/sound/radar.html, Jul. 1, 2003.

International Application No. PCT/US08/54901, International Search Report, Jul. 28, 2008.

International Application No. PCT/US08/54901, Written Opinion, Jul. 28, 2008.

International Application No. PCT/US08/56247, International Search Report, Aug. 14, 2008.

International Application No. PCT/US08/56247, Written Opinion, Aug. 14, 2008.

Page, Raymond, "A Low Power RFID Transponder," RF Design, pp. 31-32, 34, 36, Jul. 1993

USPTO Transaction History of U.S. Appl. No. 11/692,577, filed Mar. 28, 2007, entitled "Methods and Systems of Determining Physical Characteristics Associated With Objects Tagged With RFID Tags."

Transaction History of related U.S. Appl. No. 11/692,577, filed Mar. 28, 2007, entitled "Method and System to Determining Physical Characteristics Associated With Objects Tagged with RFID Tags."

Transaction History of related U.S. Appl. No. 11/746,244, filed May 9, 2007, entitled "Method and System of Placing a RFID Tag in a Continuous Transmission Mode."

Transaction History of related U.S. Appl. No. 11/867,273, filed Oct. 4, 2007, entitled "Method and System to Determine Physical Parameters as Between a RFID Tag and a Reader."

Transaction History of related U.S. Appl. No. 12/044,741, filed Mar. 7, 2008, entitled "Method and System to Determine Physical Parameters as Between an RFID Tag and a Reader."

Transaction History of related U.S. Appl. No. 12/134,103, filed Jun. 5, 2008, entitled "Systems and Methods to Determine Motion Parameters Using RFID Tags."

Transaction History of related U.S. Appl. No. 12/134,106, filed Jun. 5, 2008, entitled "Systems and Methods to Use Radar in RFID Systems."

Transaction History of related U.S. Appl. No. 12/134,107, filed Jun. 5, 2008, entitled "Systems and Methods to Determine Kinematical Parameters Using RFID Tags."

Trolly Scan (Pty) Ltd, RFID-radar(tm) Past Newsletters; 17pp , 2007.

* cited by examiner

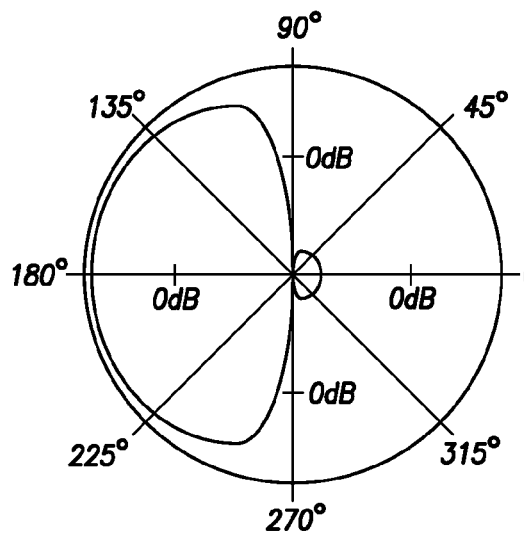
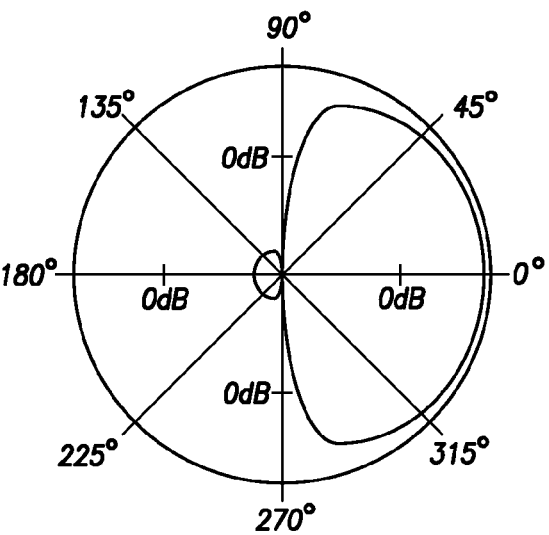
FIG.3A
FIG.3B
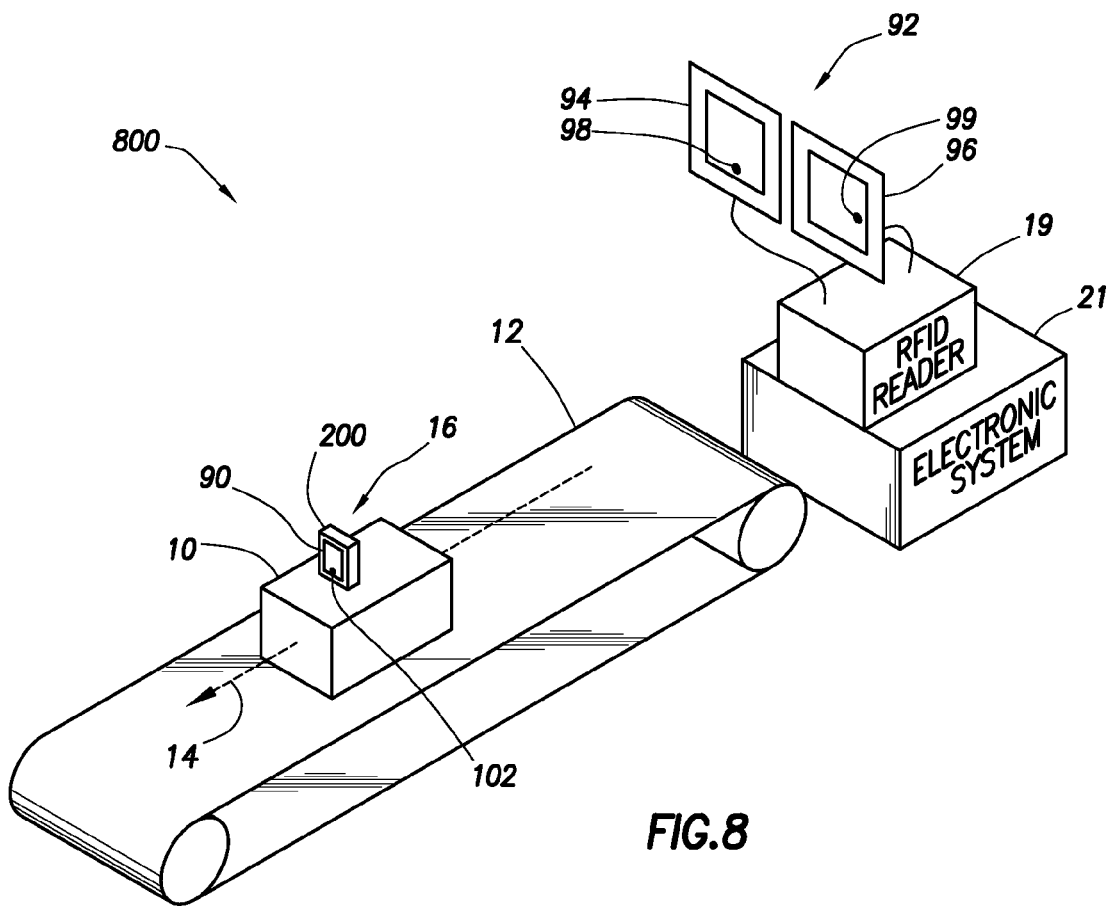
FIG.8

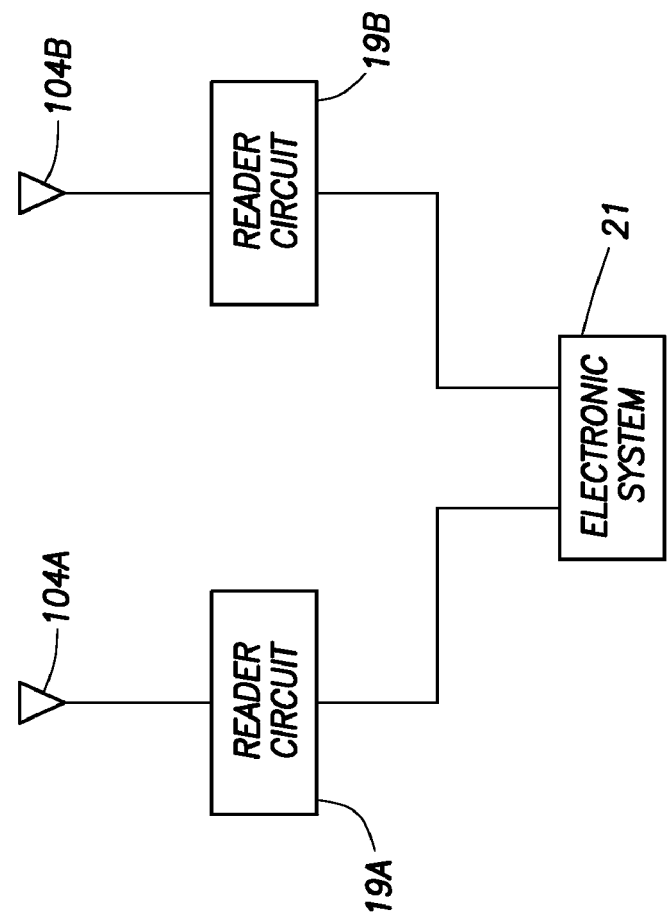
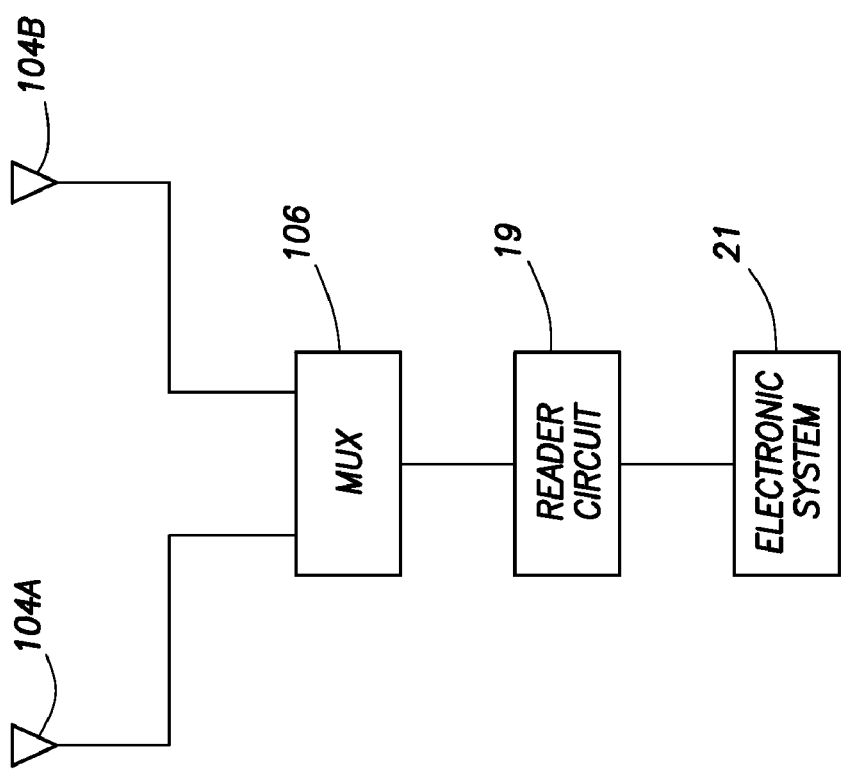
FIG. 10
FIG. 9

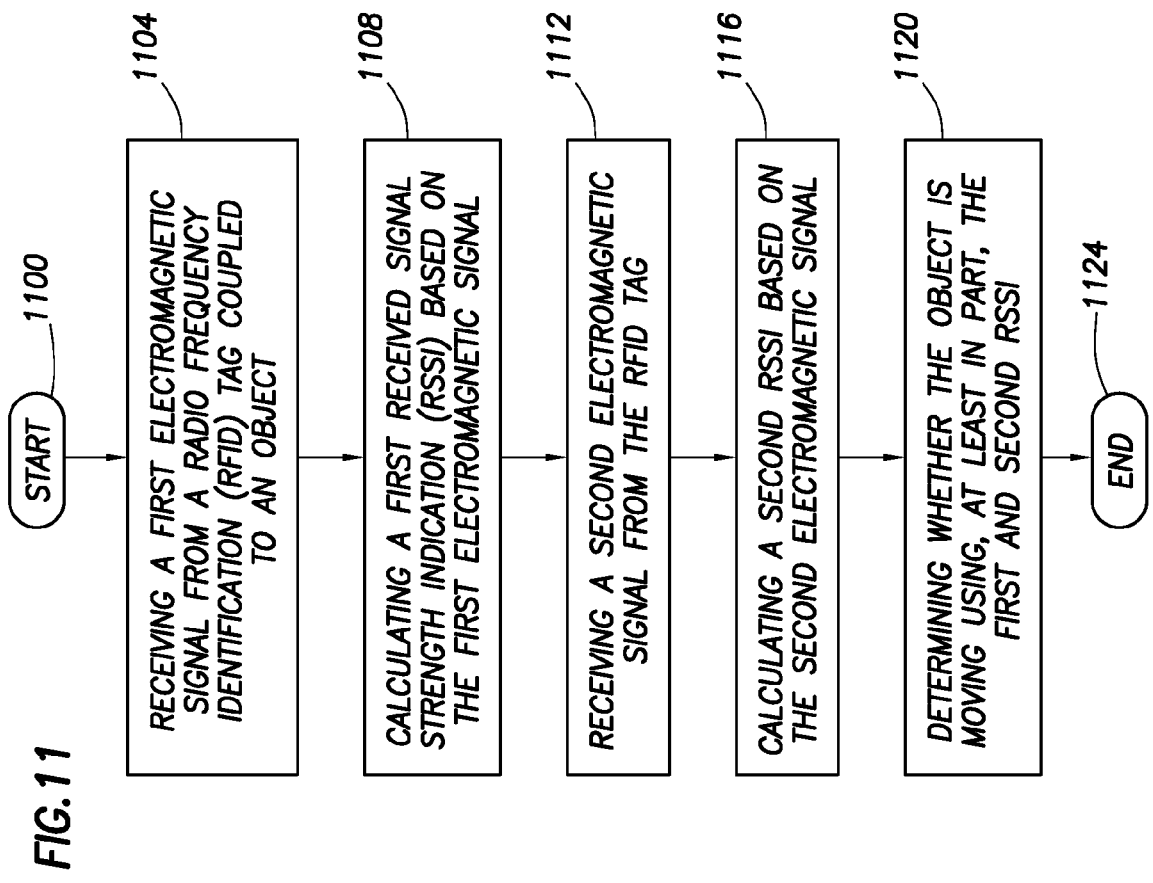

US 7,859,408 B2

METHODS AND SYSTEMS OF DETERMINING PHYSICAL CHARACTERISTICS ASSOCIATED WITH OBJECTS TAGGED WITH RFID TAGS

BACKGROUND

1. Field

The various embodiments are directed to determining motion and/or orientation objects tagged with radio frequency identification (RFID) tags.

2. Description of the Related Art

Radio frequency identification (RFID) tags are used in a variety of applications, such as goods identification in wholesale and retail sales, access cards (e.g., building access, garage access), and badging and identification of employees. However, most RFID systems constrain the RFID tags to be stationary, or only slowly moving, such that reading or interrogating of RFID tags is not adversely affected by movement of the RFID tags. In situations where tagged objects move quickly, special equipment is needed to read the RFID tags. Moreover, existing systems are typically concerned with reading RFID tags and in some cases determining location, but system and methods to determine whether the RFID tag is moving and/or orientation of the RFID tag (or the object to which the tag attaches) are not commonly employed.

BRIEF DESCRIPTION OF THE DRAWINGS

For a detailed description of various embodiments, reference will now be made to the accompanying drawings in which:

FIGS. 3A and 3B show far-field radiation (or reception) patterns for the antenna elements of the dual-sided patch antenna considered individually;

FIG. 8 shows a system in accordance with other embodiments;

FIG. 9 shows an electrical block diagram of circuitry for coupling to multiple reading antennas;

FIG. 10 shows an electrical block diagram of circuitry for coupling to multiple reading antennas;

FIG. 11 shows a method in accordance with at least some embodiments; and

FIG. 12 shows a method in accordance with at least some embodiments.

NOTATION AND NOMENCLATURE

Certain terms are used throughout the following description and claims to refer to particular system components. As one skilled in the art will appreciate, design and manufacturing companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other intermediate devices and connections. Moreover, the term "system" means "one or more components" combined together. Thus, a system can comprise an "entire system," "subsystems" within the system, a radio frequency identification (RFID) tag, a RFID reader, or any other device comprising one or more components. Further, various embodiments are directed to determining which side of an object faces a particular direction. Even though cylindrical and spherical objects may not have precisely defined "side" boundaries, for purposes of this specification and the claims cylindrical and spherical objects nonetheless are considered to have sides (e.g., a first hemisphere of a spherical object is a first side, and a second hemisphere of the spherical object is a second side).

DETAILED DESCRIPTION

The various embodiments disclosed herein are discussed in the context of radio frequency identification (RFID) tags; however, the systems and methods discussed have application beyond RFID tags to other types of radio frequency technologies. The discussion of any embodiment in relation to RFID tags is meant only to be illustrative of that embodiment, and not intended to intimate that the scope of the disclosure, including the claims, is limited to that embodiment.

Figure 1:
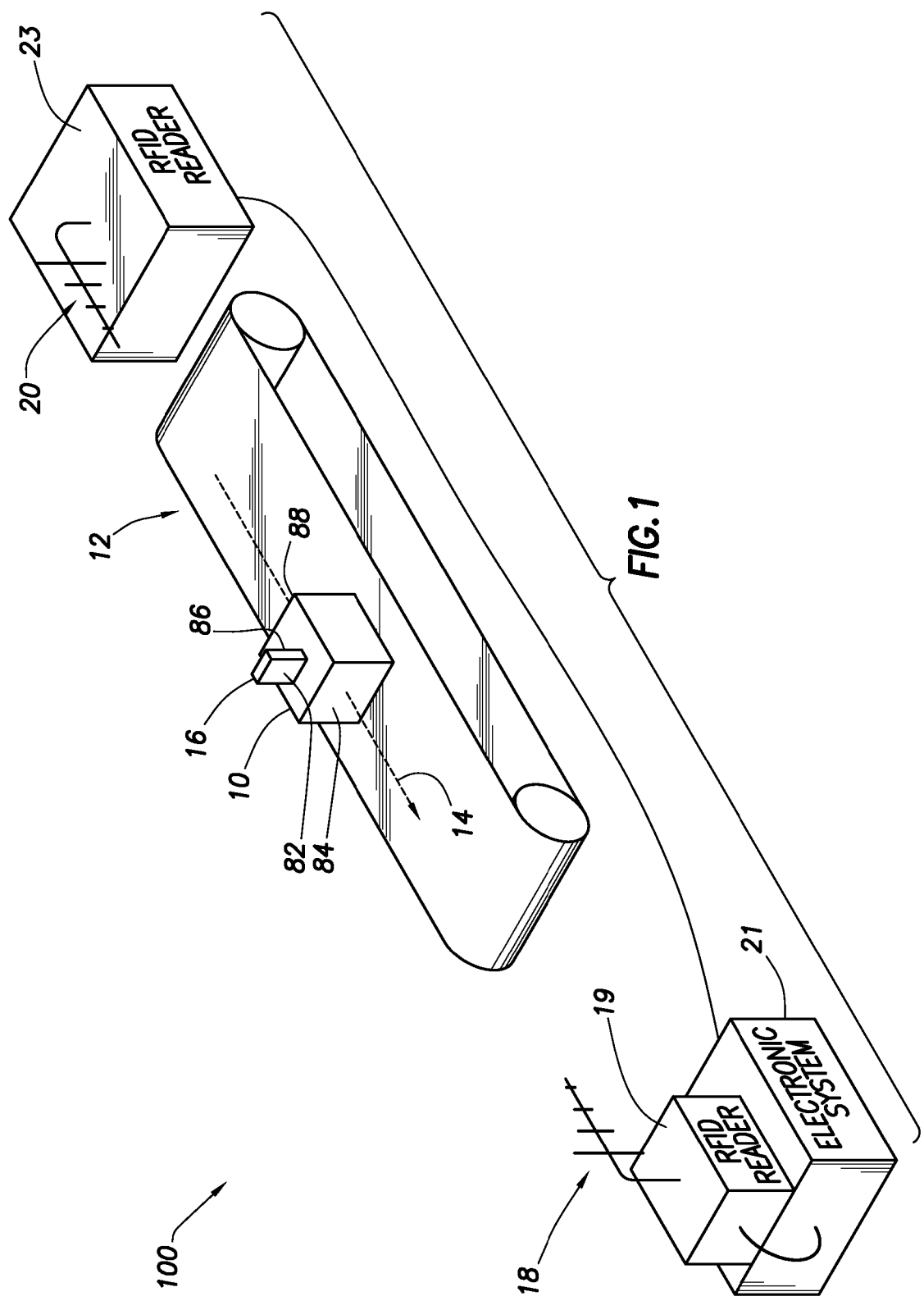
FIG. 1 shows a system in accordance with at least some embodiments.

The various embodiments are directed to determining physical characteristics associated with objects tagged with radio frequency identification (RFID) tags. FIG. 1 shows a system 100 in accordance with some embodiments. In particular, system 100 shows an object 10 on a conveyor system 12, with the object 10 selectively moving in the direction indicated by arrow 14. Conveyor system 12 is merely illustrative of any situation where an object 10 moves in two- or three-dimensional space. For example, the object 10 and conveyor system 12 are illustrative of wafer boats in semiconductor manufacturing production line, luggage in an automated luggage handling system, parcels in an automated sorting facility, or participants in a war game. The object 10 has an associated RFID tag 16, which as illustrated is visible both from in front of the object 10, and from behind the object 10. The system 100 further comprises a reading antenna 18, which as illustrated is positioned downstream of the direction of travel of the object 10. The reading antenna 18 is shown as a Yagi antenna, but other antenna types (e.g. dipole, loop or patch antennas) may be equivalently used.

In accordance with some embodiments, a RFID reader 19 and electronic system 21 couple to the reading antenna 18. The RFID reader 19 may be equivalently referred as an interrogator. The RFID reader 19 passes data obtained from the RFID tag 16 to the electronic system 21, which performs any suitable function. For example, the electronic system 21, based on the data received from the RFID tag 16, may identify the next step in a semiconductor manufacturing processes, direct a piece of luggage down a particular conveyor, direct a parcel to a particular shipping container, or identify participants in a war game. In accordance with some embodiments, the RFID reader 19 and/or the electronic system 21 (which may be a computer system) determine whether the object 10 is moving using, at least in part, a received signal strength indication (RSSI). Thus, the discussion turns to a description of RSSI.

In active and semi-active RFID tags, once queried by the RFID reader, the RFID tag broadcasts an electromagnetic signal using power from a battery internal to the RFID tag. The electromagnetic signal has encoded therein an identification value pre-programmed in the RFID circuit of the RFID tag. Stated otherwise, the electromagnetic signal carries a message, and the identification value is encoded in the data payload of the message, possibly along with other information and values. The electromagnetic signal is received by the reading antenna 18, and the RFID reader 19 extracts the message from the electromagnetic signal. When the active and/or semi-active RFID tag is very close to the reading antenna 18, the signal strength of the electromagnetic signal is high. Conversely, when the active and/or semi-active RFID tag is far from the reading antenna 18 (e.g. at a far edge of an operational zone), the signal strength of the electromagnetic signal may be low, and yet the RFID reader may still be able to extract the message and corresponding value of interest. In accordance with at least some embodiments, the RFID reader 19, in addition to extracting the message from the electromagnetic signal, also generates and/or calculates a parameter indicative of the signal strength of the electromagnetic signal that carried the message, the RSSI. For example, when the active and/or semi-active RFID tag is very close to the reading antenna, the RSSI may be a maximum (e.g., a RSSI value of 100), and when the active and/or semi-active RFID tag is at the far reaches of the usable range, the RSSI may be a minimum (e.g., a RSSI value of 1).

Passive RFID tags, unlike active and semi-active RFID tags, have no internal battery. The antenna of the passive RFID tag receives an interrogating signal transmitted from a reader circuit and attached antenna, and the power extracted from the received interrogating signal is used to power the tag. Once powered, the passive RFID tag sends a response comprising a data or identification value; however, the value is sent in the form of backscattered electromagnetic signals to the RFID reader 19 antenna 18. In particular, the RFID reader 19 and antenna 18 continue to transmit power after the RFID tag is awake. While the RFID reader 19 transmits, an antenna of the RFID tag is selectively tuned and de-tuned with respect to the carrier frequency. When tuned, significant incident power is absorbed by the antenna of the RFID tag 16 (and is used to power the underlying circuits). When de-tuned, significant power is reflected by the antenna of the RFID tag 16 to the antenna 18 of the RFID reader 19. The data or identification value thus modulates the carrier in the form of reflected or backscattered electromagnetic wave. The RFID reader 19 reads the data or identification value from the backscattered electromagnetic waves. Thus, in this specification and in the claims, the terms transmitting and transmission include not only sending from an antenna using internally sourced power, but also sending in the form of backscattered signals.

In reading of passive tags, a RSSI value may also be calculated. When the passive RFID tag is very close to the reading antenna 18, the difference in backscattered signal strength as between when the antenna of the RFID tag is absorbing power, and when the RFID tag is reflecting power, may be very high. Conversely, when the passive RFID tag is far from the reading antenna 18, the difference in backscattered signal strength as between when the antenna of the RFID tag is absorbing power and when the RFID tag is reflecting power may be very low, and yet the reader circuit may still be able to extract the message and corresponding value of interest. Here too, the RFID reader 19, in addition to extracting the message from the electromagnetic signal, also generates a parameter (RSSI) indicative of the signal strength of the electromagnetic signal that carried the message. In the case of RSSI for passive tags, the RSSI may be an indication of the ratio of the peak reflected signal strength (i.e., RFID tag reflecting power) to the background signal strength (i.e., RFID tag absorbing power). In other embodiments, the RSSI for passive tags may be the ratio of a maximum possible reflected power (i.e., signal strength with RFID tag close to the reading antenna and the RFID tag reflection) to the actual reflected power. As an example of possible RSSI, when the passive RFID tag is very close to the reading antenna, the RSSI may be a maximum (e.g. a RSSI value of 100), and when the RFID tag is at the far reaches of the usable range, the RSSI may be a minimum (e.g., a RSSI value of 1).

Regardless of the active or passive construction of the RFID tag used, in accordance with some embodiments a determination is made as to whether the RFID tag 16 and attached object 10 are moving by evaluating RSSI for multiple readings or interrogations of the RFID tag. For embodiments where the electronic system 21 (as opposed to the RFID reader 19) makes the determination of whether the object 10 is moving, the RFID reader 19 passes the identification value derived from the interrogation of the RFID tag 16 along with the RSSI for the particular interrogation to the electronic system 21, and the electronic system 21 compares RSSI values to make the determination. In other embodiments, the RFID reader 19 is configured to retain identification values and RSSI from previous interrogations. Using retained RSSI, the RFID reader 19 makes the determination of whether the object is moving and passes an indication of the movement, or lack of movement, to the electronic system 21. Independent of the precise location where the determination is made, in some embodiments movement is determined as a difference in RSSI values for different interrogations of the RFID tag 16. For example, if a first interrogation yields a RSSI of 50, and a subsequent (though not necessarily immediately subsequent) interrogation yields a RSSI of 75, the difference in the RSSI as between the two interrogations is indicative of movement of the RFID tag 16 and thus the underlying tagged object 10.

Further embodiments determine not only whether the object is moving, but also direction of movement. Consider the example above of a first interrogation resulting in a RSSI of 50, and a subsequent interrogation resulting in a RSSI of 75. As the RFID tag 16 moves closer to the reading antenna 18, the RSSI increases, and given that the subsequent reading has a higher RSSI, the RFID reader 19 and/or the electronic system 21 deduce that the RFID tag 16 and attached object 10 are moving toward the reading antenna 18. Now consider the opposite situation, where a first interrogation yields a RSSI of 75, and a subsequent interrogation yields a RSSI of 50. As the RFID tag 16 moves away from the reading antenna 18, the RSSI decreases, and given that the subsequent reading has a lower RSSI, the RFID reader 19 and/or electronic system 21 deduce that the RFID tag 16 and attached object 10 are moving away from the reading antenna 18. Stated otherwise, increasing RSSI as between two interrogations indicates movement toward the reading antenna 18, while decreasing RSSI as between two interrogations indicates movement away from the reading antenna 18.

Many atmospheric conditions affect electromagnetic signal propagation (e.g. dust and other suspended particles, and to a lesser extent relative humidity), and thus a user implementing embodiments illustrated by FIG. 1 may desire confirmation as to movement and/or direction of movement. In such situations, a second reading antenna 20 may be positioned within the system and, as illustrated, the reading antenna 20 is positioned upstream of the expected path of travel of the RFID tag 16 and attached object 10. As shown, the reading antenna 20 may have a dedicated RFID reader 23, and in other embodiments the reading antennas 18 and 20 share a RFID reader, with the reader multiplexing between the two (or more) antennas. In embodiments using multiple reading antennas, each reading antenna is used to make a plurality of interrogations of the RFID tag 16. While analysis of calculated RSSI of the plurality of interrogations from one reading antenna may show movement toward the reading antenna, analysis of RSSI associated with the plurality of interrogations from the second reading antenna may confirm the movement. The confirmation may be either by recognizing movement away from the second reading antenna (where the second reading antenna is upstream of the expected path of travel) or by recognizing movement toward the second reading antenna (when the first and second reading antennas are substantially co-located). If the movement determination associated with the second reading antenna is contradictory to the determination of the first reading antenna (e.g. both antennas show movement toward the respective antenna when the antennas are upstream and downstream respectively), then the movement determination for both antennas may be ignored, or the contradictory determinations may signal the need for calibration and or maintenance.

The embodiments discussed to this point are operational with RFID tags having any of a variety tag antennas. For example, RFID tag 16 may comprise a dipole antenna, a loop antenna or a single-sided patch antenna. In the case of a single-sided patch antenna, assuming the patch antenna faces the reading antenna 18, reading antenna 20 may not be able to interrogate the RFID tag 16. In some embodiments, object 10 may be fitted with a RFID tag system comprising a plurality of RFID tags 16 (e.g., one on the upstream face, and one on the downstream face, to address having both upstream and downstream reading antennas). Other embodiments address certain shortcomings of the single-sided patch antenna by employing a dual-sided patch antenna, as illustrated in FIG. 2.

Figure 2:
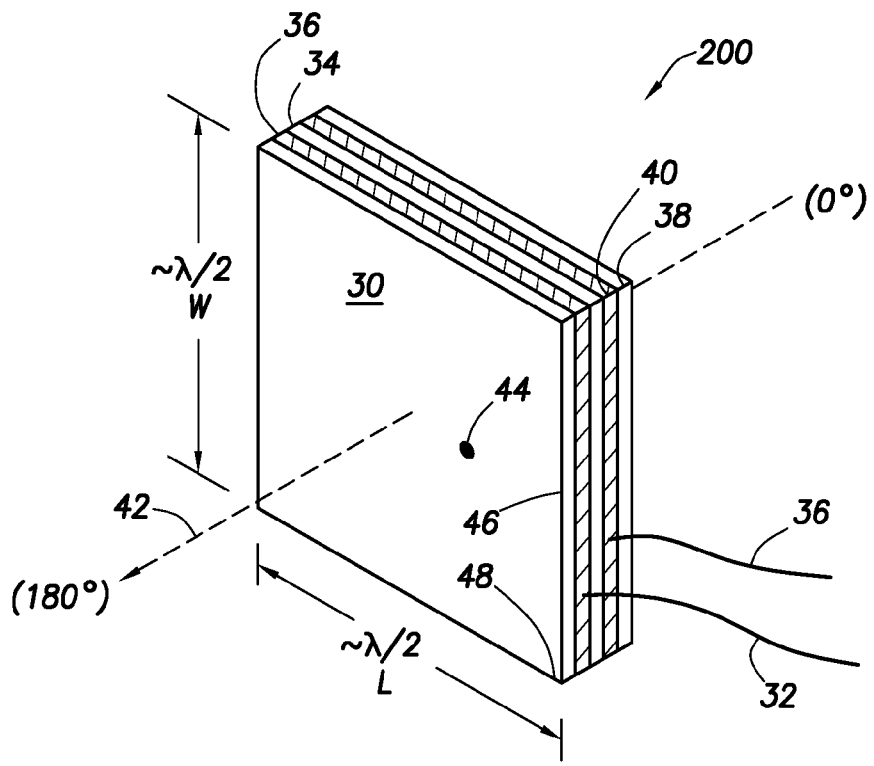
FIG. 2 shows a dual-sided patch antenna in accordance with at least some embodiments.

FIG. 2 shows a perspective view of a dual-sided patch antenna 200 in accordance with at least some embodiments. The dual-sided patch antenna 200 comprises a first radiative patch or antenna element 30. The antenna element 30 comprises a sheet of metallic material (e.g. copper) in the form of a square or rectangle in this example. The length and width of the antenna element 30 is dictated by the wavelength of the radio frequency signal that will be driven to the antenna element 30 (or that will be received by the antenna element 30), for example driven by way of lead 32. More particularly, the length and width of the antenna element 18 are each an integer ratio of the wavelength of the signal to be transmitted (or received). For example, the length and width may be approximately half the wavelength ($\lambda/2$) or a quarter of the wavelength ($\lambda/4$).

The dual-sided patch antenna 200 also comprises a ground plane or ground element 34. The antenna element 30 and the ground element 34 each define a plane, and those planes are substantially parallel in at least some embodiments. In FIG. 2, the ground element 34 length and width and the antenna element 30 length and width are shown to be approximately the same; however, the ground element length and width may be larger or smaller in other embodiments. Although the antenna element 30 and ground element 34 may be separated by air, in some embodiments a dielectric material 36 (e.g. printed circuit board material, silicon, plastic) separates the antenna element 30 from the ground element 34.

Still referring to FIG. 2, the dual-sided patch antenna 200 further comprises a second radiative patch or antenna element 38. Much like antenna element 30, the antenna element 38 comprises a sheet of metallic material (e.g. copper) in the form of a square or rectangle in this example. The antenna element 38 defines a plane, and in some embodiments the plane defined by antenna element 34 is substantially parallel to the plane defined by ground element 34. The length and width of the antenna element 38 is dictated by the wavelength of the radio frequency signal that will be driven to the antenna element 38, for example driven by way of lead 36, and in some embodiments the length and width as between the antenna elements 30 and 38 are the same. Although the antenna element 38 may be separated from the ground element 34 by air, in other embodiments a dielectric material 40 (e.g. printed circuit board material, silicon, plastic) separates the antenna element 38 from the ground element 34. Each antenna element 30, 38 comprises a centroid axis 42 (i.e., centroid being the point considered to be the center), and in some embodiments the centroid axis 42 of each antenna element are substantially coaxial.

Radio frequency signals are driven to each of the antenna elements 30 and 38 by way of probe feeds or feed points (i.e., the locations where the radio frequency signals couple to the antenna elements), such as feed point 44 for antenna element 30 (the feed point for antenna element 38 not visible in FIG. 2). The feed points are coupled to their respective leads 32 (for feed point 44) and 36 (for the feed point of the antenna element 38). The following discussion is directed to antenna element 30 and feed point 44, but the discussion is equally applicable to antenna element 38. As illustrated, the feed point 44 resides within (internal of) an area defined by the length and width of the antenna, and the internal location of the feed point is selected based on several criteria. One such criterion is the impedance seen by a radio frequency source that drives the antenna element 30. For example, shifting the feed point toward the center of the antenna element 30 along its length ("L" in the figure) tends to lower the impedance seen by the radio frequency source, while shifting along the length towards an edge (e.g., edge 46) tends to increase impedance seen by the radio frequency source. Moreover, the placement of the feed point 44 also controls polarity of the electromagnetic wave or signal created. For example, the feed point 44 as shown creates an electromagnetic signal whose electric field polarization is substantially along the length L. Shifting the feed point toward a corner (e.g., corner 48), or also using a second feed point centered along the length L, creates a circularly polarized electromagnetic wave. Thus, the feed points are internal to the length and width to meet these, and possibly other, design criteria. The discussion now turns to directivity of the dual-sided patch antenna.

Figure 4:
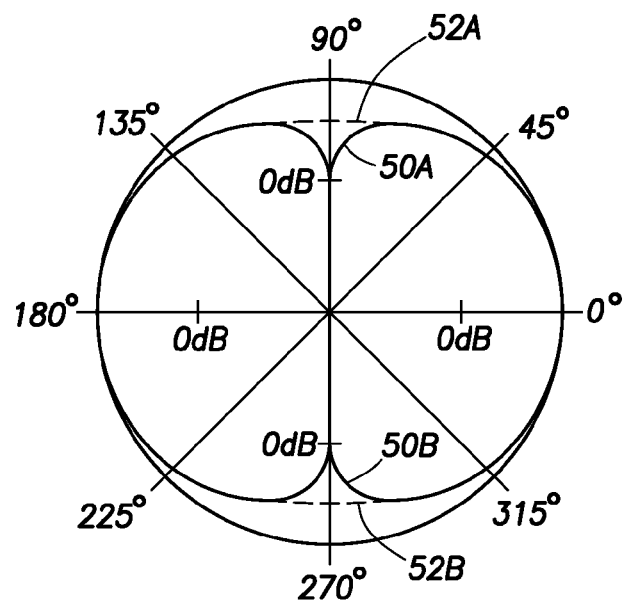
FIG. 4 shows far-field radiation (or reception) pattern for the dual-sided patch antenna of various embodiments.

Consider for purposes of explanation that the centroid axis 42 lies along the 0°-180° axis in an overhead view (i.e., looking down on the length L from above) of the dual-sided antenna of FIG. 2, and that antenna element 30 faces the 180° direction while antenna element 38 faces the 0° direction. FIGS. 3A and 3B illustrate a far-field radiation pattern for each of the antenna elements 30 and 38 respectively. In particular, FIG. 3A shows that antenna element 30 considered alone has a far-field radiation pattern that is substantially directed along the centroid axis away from the ground element 34. The plot of FIG. 3A is valid for both overhead and elevational (i.e., looking horizontally toward the width W) plots of far field radiation. Likewise, antenna element 38 considered alone has a far-field radiation pattern that is substantially directed along the centroid axis away ground element 34, and the plot (of FIG. 3B) is equally valid for both overhead and elevational plots of far-field radiation. Considering the far-field radiation patterns of antenna element 18 and antenna element 24 together, the dual-sided patch antenna 200 has a quasi-omnidirectional radiation (or reception) pattern, as illustrated in FIG. 4, with FIG. 4 equally valid for both overhead and elevational plots of far-field radiation. Stated otherwise, the far-field radiation pattern for the dual-sided patch antenna is substantially the same in all three spatial directions.

The far-field radiation patterns of FIGS. 3A, 3B and 4 show directivity, but one or more parameters of the physical system may affect the ultimate far-field radiation pattern. For example, ground elements larger than the antenna elements 30, 38 increase the size of the dips 50A and 50B at the 90° and 270° orientations, while a ground element the same size or slightly smaller may make the radiation pattern more circular (as indicated by dashed lines 52A and 52B). The far-field radiation patterns of FIGS. 3A, 3B and 4 also show gain (in decibels (dB)), but no specific numbers except that the gain may be greater than 0 dB in all directions. The actual gain values are related to parameters of the physical system such as frequency of operation and the dielectric strength of the dielectric material 36 and 40.

Figure 5:
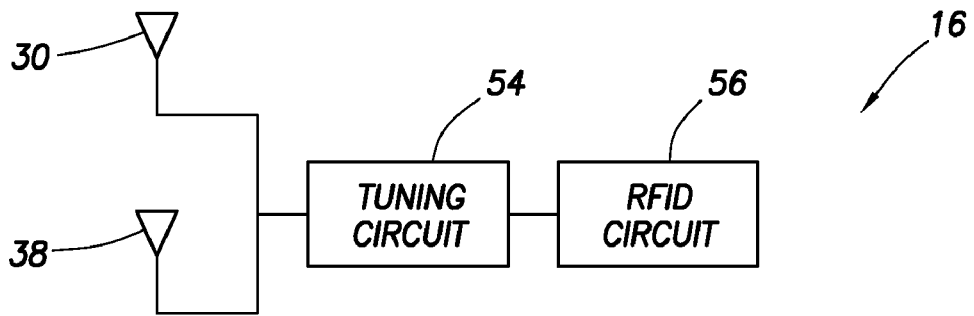
FIG. 5 shows an electrical block diagram of circuitry for coupling to the dual-sided patch antenna in accordance with at least some embodiments.

FIG. 5 illustrates an electrical block diagram of RFID tag 16 (of FIG. 1), where the RFID tag 16 comprises a dual-sided patch antenna 200. In particular, in the embodiments of FIG. 5 the antenna elements 30 and 38 are coupled to a matching or tuning circuit 54. The purpose of the tuning circuit is to tune the two coupled antennas to be resonant at a particular frequency or set of frequencies. The tuning circuit, in turn, is coupled to an RFID circuit 56. The tuning circuit 54 and RFID circuit 56 may comprise an integrated product, such as the MCRF42X family of products available from Mirochip Technologies, Inc. of Chandler, Ariz. The RFID circuit 56 holds the identification value or values, and is responsible for transmitting the value to the reader (i.e., through broadcasting using power from in internal battery, or by backscatter using power from the interrogating signal).

Figure 6:
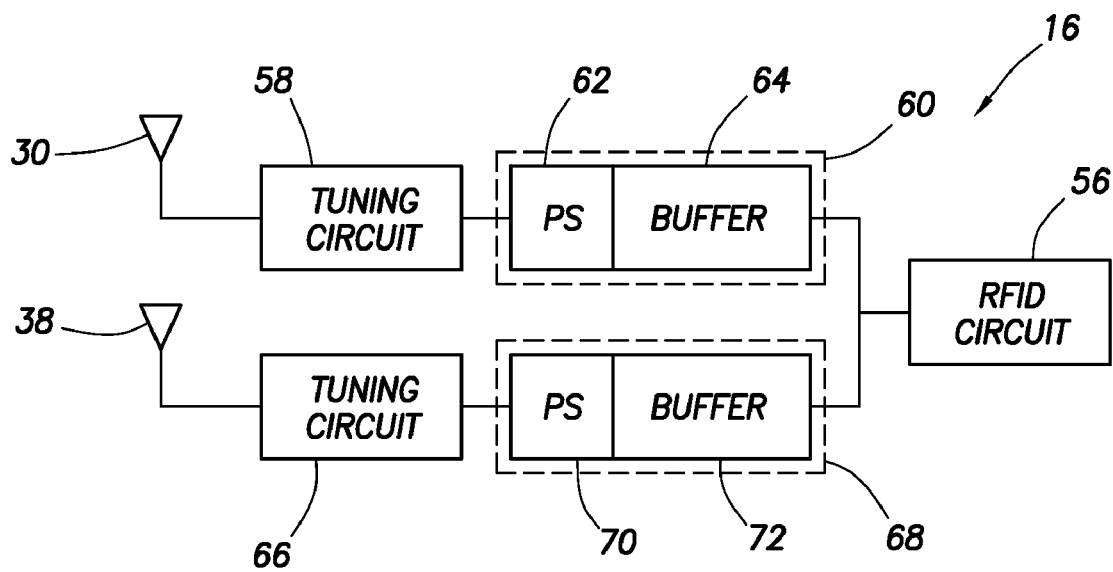
FIG. 6 shows an electrical block diagram of circuitry for coupling to the dual-sided antenna in other embodiments.

FIG. 6 shows an electrical block diagram of other embodiments where the two antenna elements of the dual-sided patch antenna 200 are electrically isolated from each other by way of isolation circuits. In particular, antenna 30 is coupled to tuning circuit 58, which in turn couples to an additional isolation circuit 60 and RFID circuit 56. In these embodiments, the isolation circuit 60 may comprise one or more of a power supply (PS) 62 and additional buffer 64. Likewise, antenna 38 is coupled to tuning circuit 66, which in turn couples to isolation circuit 68 and RFID circuit 56. Further in these embodiments, the isolation circuit 68 may comprise one or more of a power supply (PS) 70 and buffer 72. Operation of the power supply and buffer is discussed with respect to antenna 30, but the discussion is equally applicable to antenna 38. When antenna 30 is not exposed to an interrogating signal from a RFID reader (e.g. RFID reader 19 of FIG. 1), the buffer 64 electrically isolates (or de-couples) the antenna element 30 from the RFID circuit 56. However, when exposed to an interrogating signal, the buffer 64 couples the antenna 30 to the RFID circuit 56. In active tags, a battery may be the power supply 62 to provide power to sense electromagnetic signals received by the antenna element 30, and to control the additional buffer 64. Because the power supply 70 may be self powered, the location of the power supply 70 and the buffer 72 may be reversed. Moreover, a rectifying circuit may be present either in the power supply 70 or buffer 72 to convert incoming data and commands to baseband data. Using battery power, the buffer 64 continuously or periodically determines if antenna element 30 is receiving an interrogating signal. If so, the buffer 64 couples the antenna element 30 the RFID circuit 56 (e.g., by biasing the gate of a transistor to allow coupling of at least a portion of the interrogating signal to the RFID circuit 56), with power to run the buffer provided from the battery.

In semi-active and passive tags, the power supply 62 rectifies received power from the interrogating signal, converts the received power to direct current (DC) (e.g. using Schottky diodes), and uses at least some of the converted power to control the buffer 64. For example, the buffer 64 may be configured to electrically isolate the antenna element 30 from the RFID circuit 56 when no power is provided from the power supply 62 (i.e., when there is no interrogating signal received by the antenna element, or where the interrogating signal is of insufficient strength to power the buffer 64). When an interrogating signal is incident upon the antenna element 30, the power supply 62 extracts power from the signal, and uses the power to drive the buffer and couple the antenna element 30 to the RFID circuit 56. Thus, regardless of the tag type, when an interrogating signal is received on antenna element 30, the signal is coupled to the RFID circuit 56, which responds to the reader 19 (FIG. 1) with an identification value.

Figure 7:
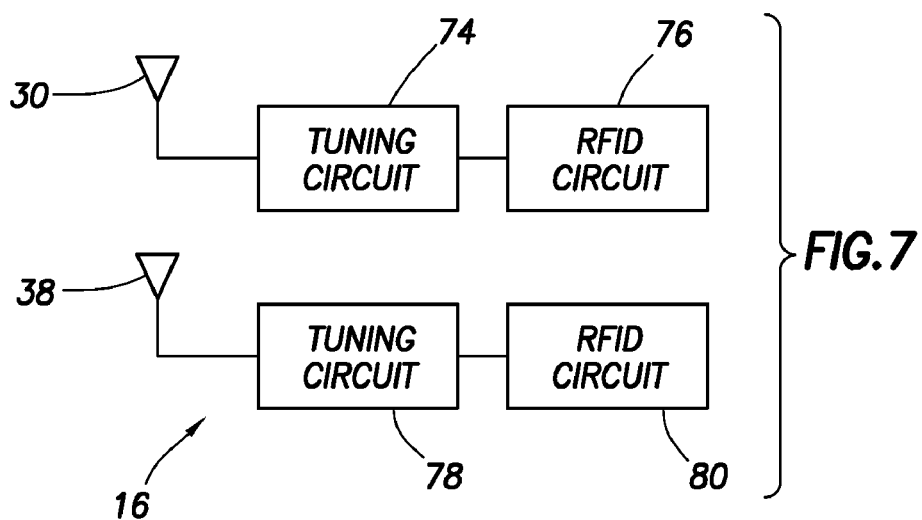
FIG. 7 shows an electrical block diagram of circuitry for coupling to the dual-sided antenna in yet still other embodiments.

FIG. 7 illustrates yet still further alternative embodiments of a RFID tag 16. In particular, in the embodiments illustrated in FIG. 7 each antenna element 30, 38 of the dual-sided patch antenna 200 couples to its own tuning circuit and RFID circuit. Antenna element 30 couples to tuning circuit 74 and RFID circuit 76, while antenna element 38 couples to tuning circuit 78 and RFID circuit 80. RFID circuits 70 and 74 may be designed and configured to hold and provide the same identification values when interrogated, or different values. Thus, when interrogated the RFID circuits 76 and 78 may respond with the same value, or with different values. Further, the two RFID circuits may be coupled in order to share data or to enable other functionality.

Returning to FIG. 1, with RFID tag 16 having a dual-sided patch antenna 200 with one antenna element facing or exposed to the reading antenna 18, and the other antenna element facing or exposed to the reading antenna 20, then embodiments discussed above where movement and direction of movement are verified by reading antenna 20 may be used. Additionally, using RFID tag 16 with dual-sided patch antennas enables determination of more than just movement and direction of movement.

Consider situations where the RFID tag 16 of FIG. 1 has a dual-sided patch antenna 200, with each antenna element having a dedicated RFID circuit pre-programmed with different identification values (i.e., FIG. 7 with RFID circuits 76 and 80 having different identification values). In the illustrative situation of FIG. 1 with the assumptions of different identification values, when reading antenna 18 is used to interrogate the RFID tag 16, a particular value is determined. When reading antenna 20 is used to interrogate the RFID tag 16, a different identification value is determined. Thus, if a first identification value is associated with a first side 82 of the RFID tag 16 (and thus the first side 84 of the object 10), obtaining the first identification value by interrogation of the RFID tag 16 with the reading antenna 18 reveals an orientation of the RFID tag 16 and attached object 10 (i.e., which direction the RFID tag 16 and attached object 10 are facing). Likewise, if a second identification value is associated with a second side 86 of the RFID tag 16 (and thus the second side 88 of the object 10), obtaining the second identification value by interrogation of the RFID tag 16 with the reading antenna 20 reveals an orientation of the RFID tag 16 and attached object 10 (i.e., again, which direction the RFID tag 16 and attached object 10 are facing). The system 100 may thus determine an orientation, in these embodiments the orientation being which side of the RFID tag 16 and attached object 10 face or are exposed to a particular direction. Moreover, combined with the various embodiments using RSSI to determine whether the RFID tag 16 and attached object 10 are moving (and in some cases which direction), the system 100 may thus determine which face of the object is exposed to the particular reading antenna, and in which direction the face is moving.

Detecting orientation by determining which side of the RFID tag 16 and attached object 10 face a particular direction are not limited to embodiments having RFID tags 16 with dual-sided patch antennas 200 and dedicated RFID circuits for each antenna element. Consider a situation where the RFID tag 16 of FIG. 1 has a dual-sided patch antenna 200, but only a single RFID circuit shared between the two antenna elements (i.e., embodiments of FIG. 5 or 6). While the identification value received from the RFID tag 16 will be the same regardless or independent of which antenna elements is interrogated (because of the shared RFID circuit), the antenna elements of the dual-sided patch antenna 200 may be configured with different physical characteristics to distinguish the two antenna elements.

FIG. 8 illustrates a system 800 in accordance with further embodiments that distinguish the two antenna elements based on characteristics of the electromagnetic signal transmitted by each antenna element. In particular, system 800 shows object 10 on the illustrative conveyor system 12, with the object 10 selectively moving in the direction indicated by arrow 14. The object 10 has an associated RFID tag 16 comprising a dual-sided antenna 200 (only one antenna element 90 is visible). The system 900 further comprises reading antennas 92, in this example comprising two patch antennas 94 and 96. The reading antennas 92 are shown positioned upstream of the direction of travel of the object 10 such that the feed points of the respective patch antennas are visible in the drawing, but the patch antennas may be alternative positioned downstream of the path of travel, or there may be reading antennas both upstream and downstream of the path of travel. Electronic system 21 and RFID reader 19 couple to the reading antennas 92, and the RFID reader 19 reads the RFID tag 16 by way of an antenna element of the RFID tag 16 positioned so as to be exposed to the reading antennas 92 (in the illustrative situation of FIG. 8, the antenna element of the RFID tag 16 that is exposed to the reading antennas 92 is not visible).

In accordance with these embodiments, the reading antennas 92 are configured to preferentially receive electromagnetic signals of different polarizations. For example, because of the location of the feed point 98 for patch antenna 94, the patch antenna 94 preferentially receives electromagnetic signals having vertically oriented electric field components. Stated otherwise, patch antenna 94 is said to have vertical polarization. Because of the location of the feed point 99 for patch antenna 96, the patch antenna 96 preferentially receives electromagnetic signals having horizontally oriented electric field components. Stated otherwise, patch antenna 96 is said to have horizontal polarization. While the illustrative reading antennas 92 are shown as patch antennas, any set of antennas having different polarizations (even if the difference in polarization is by way of identical antennas in different physical orientations) may be used. If RFID tag 16 responds to an interrogation from the RFID reader 19 with a vertically oriented electromagnetic signal, patch antenna 94 will have a high RSSI for the response, while patch antenna 96 will not receive the response, or will receive are response with a low RSSI. Conversely, if RFID 16 responds to an interrogation from the RFID reader 19 with a horizontally oriented electromagnetic signal, patch antenna 96 will have a high RSSI for the response, while patch antenna 94 will not receive the response, or will receive a response with a low RSSI.

In these embodiments, in order to determine which face of the RFID tag 16 is exposed to the reading antennas 34, each antenna element of the dual-sided patch antenna 200 is configured to have different polarizations. In the illustration of FIG. 8, antenna element 90 of the dual-sided patch antenna 200 is shown to have a feed point 102 configured for transmitting electromagnetic signals with vertical electric field polarization. Though not visible, in accordance with these embodiments the antenna element of dual-sided patch antenna 200 that is exposed to the reading antennas 92 is configured for transmitting electromagnetic signals with horizontal electric field polarization. Thus, in spite of the fact that each antenna element of the dual-sided patch antenna 200 in these embodiments responds with the same identification value, the RFID reader 19 and/or electronic system 21 may determine which face of the RFID tag is exposed to the reading antennas 92 by the polarization of the response to the interrogating signal (so long as the object 10 is constrained to a particular rotational orientation). Moreover, in addition to determining orientation being which face of the RFID tag 16 is exposed to the reading antennas, the RFID reader 19 and/or electronic system 21 may make determinations as to whether there is movement of the RFID tag 16 and attached object 10, and if there is movement detected, the direction of movement may be determined based on RSSI values of a plurality of readings of the RFID tag 16.

The embodiments with respect to determining an orientation based on the polarization of electromagnetic signals are discussed as having vertical and horizontal electromagnetic signals and related antennas; however, any two different polarizations may be used. For example, one face (first antenna element) of the RFID tag 16 could be identified by a right circularly polarized electromagnetic signal, and the second face (second antenna element) of the RFID tag 16 could be identified by a left circularly polarized signal. Further still, one face of the RFID tag 16 could be identified with a circularly polarized electromagnetic signal (right or left), and the second face could be identified by a vertical (or horizontal) polarized electromagnetic signal.

Consider now a situation such as FIG. 8 where the RFID tag 16 uses dual-sided patch antenna 200, with each antenna element having a dedicated RFID circuit (as shown in FIG. 7), and further with each antenna element having different polarizations. In these embodiments, not only does the RFID reader 19 and/or electronic system 21 distinguish which face of the RFID tag 16 is exposed to the reading antennas 92, but also determines the rotational orientation of the RFID tag 16 and attached object 10. In particular, because each antenna element of the dual-sided patch antenna 200 has a dedicated RFID circuit, programming each RFID circuit with separate identification values means that the RFID reader 19 and/or electronic system 21 is capable of deducing which face of the RFID tag 16 is exposed to the antenna system 92. If antenna element 90 of the dual-sided patch antenna 200 is configured to have vertical polarization when the object 10 is vertically oriented, and the second antenna element of the dual-sided patch antenna 200 is configured to have horizontal polarization when the object 10 to his vertically oriented, then the polarization of the electromagnetic signal received at the reading antennas is indicative of the rotational orientation of the RFID tag 16 and object 10.

With the illustrative orientation and polarizations in mind, if the RFID reader 19 receives an identification value indicating antenna element 90 is exposed to the reading antennas 92, and moreover that the received electromagnetic signal was vertically polarized, then the face of the RFID tag 16 comprising antenna element 90 is exposed to the reading antennas 94, and the RFID tag 16 and object 10 are vertically oriented. Similarly, if the RFID reader 19 receives an identification value indicating antenna element 90 is exposed to the reading antennas, and moreover that the received electromagnetic signal was horizontally polarized, then the face of the RFID tag 16 comprising antenna element 90 is exposed to the reading antennas 92, but the RFID tag 16 and object 10 are horizontally oriented (i.e., rotated 90° about an axis defined by line 14). A similar situation exists for the antenna element of RFID tag 16 that is not visible in FIG. 8; nevertheless, the RFID reader 19 and/or the electronic system 21 may determine that the particular face of the RFID tag 16 comprising the antenna element is exposed to the reading antennas (based on the identification values), and a rotational orientation of the RFID tag 16 and object 10 (based on the polarization of the electromagnetic signals).

Embodiments that determine which face of the RFID tag 16 is exposed to the reading antennas (based on the identification values) and the orientation of the RFID tag 16 and attached object 10 (based on the polarization of the electromagnetic signal) may also determine movement of the RFID tag 16 and attached object 10 (as discussed above using differences in RSSI as between a plurality of interrogations), and also direction of movement (again as discussed above using the rising or falling difference in RSSI as between a plurality of interrogations).

Still referring to FIG. 8, yet still other embodiments determine physical characteristics being orientation and/or movement, but not necessarily which face of the RFID tag 16 is exposed to the reading antennas. Consider a situation where the RFID tag 16 delivers the same identification value regardless of the antenna element exposed to the reading antennas (i.e., shared RFID circuit as in FIGS. 5 and 6, or separate RFID circuits programmed with the same identification value as in FIG. 8), and also that each reading antenna element has the same polarization (e.g. vertical polarization). The reading antennas 92, RFID reader 19 and/or electronic system 21 may thus determine rotational orientation based on the polarization of the electromagnetic signal received. In the specific case of vertically polarized antenna elements when the object 10 is vertically oriented, a received electromagnetic signal with a vertical orientation (i.e., received by patch antenna 94) indicates the object 10 is vertically oriented. Likewise, a received electromagnetic signal with a horizontal orientation (i.e., received by patch antenna 96) indicates the object 10 is horizontally oriented. Moreover, the RFID reader 19 and/or electronic system 21 may determine movement of the movement of the RFID tag 16 and attached object 10 (as discussed above using differences in RSSI as between a plurality of interrogations), and also direction of movement (again as discussed above using the rising or falling difference in RSSI as between a plurality of interrogations).

The embodiments discussed with respect to FIGS. 1 and 8 show multiple reading antennas (i.e., reading antennas 18 and 20 for FIG. 1, and reading antennas 92 for FIG. 8 comprising patch antennas 94 and 96). FIG. 9 illustrates at least some embodiments of coupling the reading antennas to underlying RFID reader. In particular, FIG. 9 shows two reading antennas 104A and 104B (which antennas could be, for example, antennas 18 and 20 respectively of FIG. 1, or patch antennas 94 and 96 respectively of FIG. 9). The reading antennas 104A and 104B in FIG. 9 couple to a single RFID reader 19 by way of multiplexer 106, and the RFID reader 19 also couples to an electronic system 21. FIG. 10 illustrates yet still further embodiments, where reading antennas 104A and 104B couple to reader circuits 19A and 19B respectively, and each reader circuit 19A and 19B then couples to electronic system 21.

The various embodiments where the face of the RFID tag 16 exposed to the readers is determined were discussed in relation to a dual-sided patch antenna 200 with each element having a RFID circuit, or a dual-sided patch antenna 200 having a single RFID circuit but with different polarizations of the antenna elements; however, in other embodiments RFID tags with a dual-sided patch antenna may be replaced with multiple RFID tags coupled on each face of the object. For example, each face of the object may have an RFID tag, but each RFID tag provides a different identification number when interrogated. Thus, the face of the object may be determined based on the identification number. As yet another example, each face of the object may have a RFID tag where each RFID tag provides the same identification number when interrogated, but the polarization of the electromagnetic signals is different for each RFID tag. In this example, the face of the object may be determined based on the polarization of the received signal.

In a related manner, the various embodiments of determining the rotational orientation of the RFID tag and/or attached object were discussed in relation to a dual-sided patch antenna 200 with each antenna element having specific polarization; however, in other embodiments RFID tags with dual-sided patch antennas may be replaced with multiple RFID tags coupled on each face of the object. For example, each face of the object may have an RFID tag, with the polarization of the antenna for the each RFID tag related to a particular orientation of the object. Thus, by determining the orientation of the electromagnetic signal at the reading antenna, the orientation of the object can be determined.

FIG. 11 shows a method in accordance with at least some embodiments. In particular, the method starts (block 1100) and moves to receiving a first electromagnetic signal from a radio frequency identification (RFID) tag coupled to an object (block 1104). Next, a first RSSI is calculated based on the first electromagnetic signal (block 1108). The method also comprises receiving a second electromagnetic signal from the RFID tag (block 1112) and calculating a second RSSI based on the second electromagnetic signal (block 1116). Finally, a determination is made as to whether the object is moving using, at least in part, the first and second RSSI (block 1120), and the illustrative method ends (block 1124). In some embodiments, determining whether the object is moving may also comprise determining whether the object is moving toward or away from a reading antenna, with the determining based, at least in part on the first and second RSSI. For example, if the first RSSI is a relatively low number and the second RSSI is a relatively high number, then it may be deduced that the RFID tag is moving toward the reading antenna. Conversely, if the first RSSI is a relatively high number and the second RSSI is a relatively low number, then it may be deduced that the RFID tag is moving away from the reading antenna.

FIG. 12 illustrates other methods in accordance with the various embodiments. In particular, the method starts (block 1200), and moves to sending an interrogating signal to the RFID tag coupled to an object (block 1204). Based on the interrogation the RFID tag sends an electromagnetic signal, and thus the next step in the illustrative method may be receiving an electromagnetic signal transmitted by a RFID tag (block 1208). Thereafter, a determination is made as to the orientation of the object, with the determination being based, at least in part, on the electromagnetic signal (block 1212), and the method ends (block 1216). Determining the orientation may take many forms. In some embodiments determining the orientation further comprises determining which side of the object substantially faces a reading antenna. In yet further embodiments, determining orientation further comprises determining a rotational orientation of the object.

The dual-sided patch antenna 200 of FIG. 2 may be constructed in several ways. In some embodiments, the antenna 200 may be constructed using flexible sheets of metallic and dielectric material adhered together and cut to appropriate dimensions. In alternative embodiments, the antenna 200 may be manufactured, such as by deposition of the metallic portions and growth of dielectric portions by way of semiconductor manufacturing techniques. In yet still other embodiments, the antenna 200 may be constructed using a combination of techniques, such as depositing metallic layers on a dielectric material such as a printed circuit board (PCB), and then mechanically coupling two or more PCBs to form the antenna.

The above discussion is meant to be illustrative of the principles and various embodiments of the present invention. Numerous variations and modifications will become apparent to those skilled in the art once the above disclosure is fully appreciated. For example, while the antenna 200 is shown with a single ground element, the dual-sided patch antenna 200 may be manufactured by adhering two patch antennas back-to-back, meaning that two ground elements may be present, yet same advantages achieved. It is intended that the following claims be interpreted to embrace all such variations and modifications.

What is claimed is:

1. A computer implemented method comprising:
   receiving, using a computing device, a first electromagnetic signal from a radio frequency identification (RFID) tag coupled to an object;
   calculating a first received signal strength indication (RSSI) based on the first electromagnetic signal;
   receiving a second electromagnetic signal from the RFID tag;
   calculating a second RSSI based on the second electromagnetic signal;
   determining whether the object is moving using, at least in part, the first and second RSSI; and
   determining a rotational orientation of the RFID tag by receiving the first electromagnetic signal with a particular polarization and determining which side of the RFID tag faces a reading antenna.

2. The method of claim 1 wherein the determining whether the object is moving further comprises determining whether the object is moving toward or away from the reading antenna, the determining based, at least in part, on the first and second RSSI.

3. The method of claim 1 wherein each of the receiving a first electromagnetic signal and the receiving a second electromagnetic signal further comprises receiving from the RFID tag having an antenna being one or more selected from the group consisting of: a dipole antenna; a loop antenna; a patch antenna; and a dual-sided patch antenna.

4. The method of claim 1 wherein determining the rotational orientation of the RFID tag further comprises one or more selected from the group consisting of:
   receiving a value from the RFID tag that indicates which side of the RFID tag faces the reading antenna; and
   receiving the electromagnetic signal with the particular polarization, the polarization indicating which side of the RFID tag faces the reading antenna.

5. A system comprising:
   a frequency identification (RFID) tag configured to couple to an object;
   a reading antenna in operational relationship to the RFID tag; and
   a reader circuit coupled to the reading antenna, the reader circuit configured to generate a received signal strength indication (RSSI) for each interrogation of the RFID tag;
   wherein the system is configured to determine whether the RFID tag is moving based on RSSI as between two interrogations of the RFID tag;
   wherein the RFID tag has two faces;
   wherein the system is configured to determine which face of the RFID tag is exposed to the reading antenna;
   wherein the RFID tag further comprises a dual-sided patch antenna, each particular patch of the dual-sided patch antenna transmits an electromagnetic signal when the particular patch is interrogated;
   wherein the system is configured to determine which face of the RFID tag is exposed to the reading antenna based on the electromagnetic signal corresponding to the interrogated patch.

6. The system of claim 5 wherein the reader circuit is configured to determine whether the RFID tag is moving.

7. The system of claim 5 further comprising an electronic system coupled to the reader circuit, wherein the electronic system is configured to determine whether the RFID tag is moving.

8. The system of claim 5 wherein the system is configured to determine a direction of movement of the RFID tag.

9. The system of claim 8 wherein the system is configured to determine whether the RFID tag is moving toward or away from the reading antenna based, at least in part, on RSSI as between two interrogations.

10. The system of claim 5 wherein the system is configured to determine orientation of the object by determining which side of the RFID tag faces the reading antenna.

11. The system of claim 5 wherein the system is configured to determine which face of the RFID tag is exposed to the reading antenna based on data payload encoded in the electromagnetic signal corresponding to the interrogated patch.

12. The system of claim 5 wherein the system is configured to determine which face of the RFID tag is exposed to the reading antenna based on a polarization of the electromagnetic signal corresponding to the interrogated patch.

13. The system of claim 12 further comprising:
   wherein the reading antenna comprises:
   a first antenna having a first polarization; and
   a second antenna having a second polarization different than the first polarization;
   wherein the system is configured to determine polarization of the electromagnetic signals based, at least in part, on which of the first or second antennas have greater RSSI for the electromagnetic signal corresponding to the interrogated patch.

14. A system comprising:
   a frequency identification (RFID) tag configured to couple to an object;
   a reading antenna in operational relationship to the RFID tag; and
   a reader circuit coupled to the reading antenna, the reader circuit configured to generate a received signal strength indication (RSSI) for each interrogation of the RFID tag;
   wherein the system is configured to determine whether the RFID tag is moving based on RSSI as between two interrogations of the RFID tag;

wherein the RFID tag couples to a first side of the object; a second RFID tag couples to a second side of the object; wherein the system is configured to determine which side of the object faces the reading antenna; wherein the RFID tag has a tag antenna with a first polarization; wherein the second RFID tag has a tag antenna with a second polarization different than the first polarization; and wherein the system is configured to determine which RFID tag faces the reading antenna based on polarization of an electromagnetic signal received by the reading antenna.

15. The system of claim 14 further comprising: wherein the RFID tag has a first identification value; wherein the second RFID tag has a second identification value different than the first identification value; and wherein the system is configured to determine which RFID tag faces the reading antenna based on which of the first or second identification values are received from an interrogation.

16. The system of claim 14 further comprising an electronic system coupled to the reader circuit, wherein the electronic system is configured to determine whether the RFID tag or the second RFID tag is moving.

17. The system of claim 14 wherein the system is configured to determine a direction of movement of the RFID tag or the second RFID tag.

18. The system of claim 14 wherein the system is configured to determine whether the RFID tag or the second RFID tag is moving toward or away from the reading antenna based, at least in part, on RSSI as between two interrogations.

19. The system of claim 14 wherein the system is configured to determine orientation of the object by determining which of the RFID tag or the second RFID tag faces the reading antenna.

20. The system of claim 14 wherein the system is configured to determine orientation of the object by determining which of a plurality of RFID tags faces the reading antenna.

21. The system of claim 14 wherein the first polarization or the second polarization is vertical electric field polarization.

22. The system of claim 14 wherein the first polarization or the second polarization is horizontal electric field polarization.

23. A system comprising:
a frequency identification (RFID) tag configured to couple to an object;
a reading antenna in operational relationship to the RFID tag; and
a reader circuit coupled to the reading antenna, the reader circuit configured to generate a received signal strength indication (RSSI) for each interrogation of the RFID tag;
wherein the system is configured to determine whether the RFID tag is moving based on RSSI as between two interrogations of the RFID tag;
wherein the system is configured to determine rotational orientation of the RFID tag by determining:
polarization of an electromagnetic signal, and
which of a plurality of RFID tags faces the reading antenna.

24. The system of claim 23 further comprising:
wherein the reading antenna further comprises:
a first antenna having a first polarization; and
a second antenna having a second polarization different than the first polarization;
wherein the system is configured to determine the rotational orientation of the RFID tag based, at least in part, on portions of the electromagnetic signal received by each of the first and second receiving antennas.

25. The system of claim 23 wherein a determination whether the object is moving toward or away from the reading antenna is based, at least in part, on a first and a second RSSI.

26. The system of claim 23 wherein the RFID tag comprises an antenna being one or more selected from the group consisting of: a dipole antenna; a loop antenna; a patch antenna; and a dual-sided patch antenna.

27. The system of claim 23 wherein the polarization is vertical electric field polarization.

28. The system of claim 23 wherein the polarization is horizontal electric field polarization.

29. A tangible machine-readable medium having stored thereon a set of instructions which when executed perform a method comprising:
receiving a first electromagnetic signal from a radio frequency identification (RFID) tag coupled to an object, wherein the RFID tag is one of a plurality of RFID tags;
calculating a first received signal strength indication (RSSI) based on the first electromagnetic signal;
receiving a second electromagnetic signal from the RFID tag;
calculating a second RSSI based on the second electromagnetic signal;
determining whether the object is moving using, at least in part, the first and second RSSI; and
determining rotational orientation of the RFID tag by receiving the first electromagnetic signal with a particular polarization, indicative of the rotational orientation of the RFID tag and determining which of the plurality of RFID tags faces a reading antenna.

30. The machine-readable medium of claim 29 wherein the determining whether the object is moving further comprises determining whether the object is moving toward or away from the reading antenna, the determining based, at least in part, on the first and second RSSI.

31. The machine-readable medium of claim 29 wherein each of the receiving a first electromagnetic signal and the receiving a second electromagnetic signal further comprises receiving from the RFID tag having an antenna being one or more selected from the group consisting of: a dipole antenna; a loop antenna; a patch antenna; and a dual-sided patch antenna.

32. The machine-readable medium of claim 29 wherein determining the rotational orientation of the RFID tag further comprises one or more selected from the group consisting of: receiving an identification value that indicates which of the plurality of RFID tags faces the reading antenna; and receiving the first electromagnetic signal with the particular polarization, wherein the polarization indicates which of the plurality of RFID tags faces the reading antenna.

* * * * *